No. 744,365. PATENTED NOV. 17, 1903.
W. D. LABADIE.
INJECTOR OR EJECTOR.
APPLICATION FILED DEC. 13, 1902.
NO MODEL.
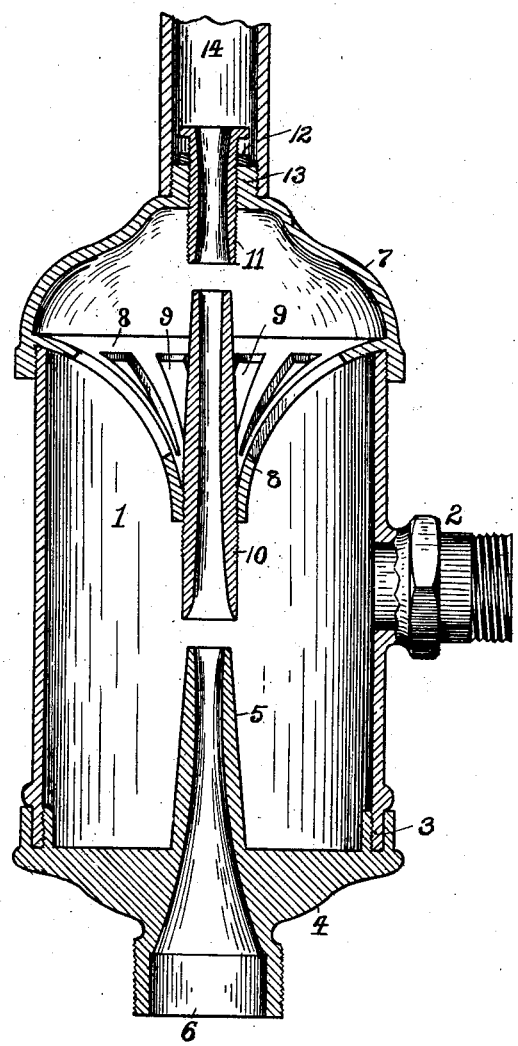
Witnesses:
George Oltsch
Maggie Oltsch
William D. Labadie.
Inventor
By Lehmann & Dalton
Attorneys.

No. 744,365. Patented November 17, 1903.

UNITED STATES PATENT OFFICE.

WILLIAM D. LABADIE, OF SOUTH BEND, INDIANA.

INJECTOR OR EJECTOR.

SPECIFICATION forming part of Letters Patent No. 744,365, dated November 17, 1903.

Application filed December 13, 1902. Serial No. 135,130. (No model.)

*To all whom it may concern:*

Be it known that I, WILLIAM D. LABADIE, a citizen of the United States, residing at South Bend, in the county of St. Joseph and State of Indiana, have invented certain new and useful Improvements in Injectors or Ejectors; and I do hereby declare the following to be a full, clear, and exact description of the invention, such as will enable others skilled in the art to which it appertains to make and use the same.

My invention relates to improvements in injectors or ejectors.

The object of the invention is to provide an injector or ejector of simple and inexpensive construction wherein the parts are detachably and adjustably connected to permit the same to be taken apart and cleaned and the ejecting tube and nozzle adjusted to regulate the quantity of water ejected without changing the pressure of the steam.

With these and other objects in view the invention consists in the novel construction, combination, and arrangement of parts, all as will be more fully described hereinafter, and finally pointed out in the appended claims.

The invention is illustrated by a view in longitudinal vertical section.

Referring to the drawing in detail, 1 designates a cylindrical chamber or casing into which the water is admitted from a suitable water-supply and to which it is connected by a coupling 2. The lower end of the casing is interiorly screw-threaded to receive the threaded flange 3 of a cap 4, which is provided with an integral steam-injecting nozzle 5, projecting into the casing, and an integral coupling-head 6, projecting from the end thereof and adapted for connection with a suitable steam-supply. The upper end of the casing is exteriorly screw-threaded to receive the threaded flange of a cap 7, having an integral contracted depending wall 8, provided with apertures 9 for the admission of the water to the cap. This depending wall serves as a support for the ejecting-tube 10, which is screwed into the threaded opening therein, so that when the cap 7 is removed the tube 10, which is in alinement with the nozzle 5, may be adjusted nearer to or farther from the nozzle to regulate the quantity of water to be ejected from the chamber 1.

On the upper end of the cap 7 is adjustably mounted, preferably by screw-threads, an ejecting-nozzle 11. A jam-nut 12 is fitted on the nozzle and adapted to engage the outer end of the boss 13 to hold the nozzle in its adjusted position.

It will be seen that the caps 4 and 7 may be readily removed to clean the interior of the casing as well as to adjust the tube 10 and nozzle 11 relatively to each other and to the stationary nozzle 5, and the nozzle 11 and tube 10 may be moved into engagement with each other to form a continuous tube, in which case the quantity of water ejected from the casing is decreased without changing the pressure of steam. When, however, the tube and nozzle are separated, as shown in the drawing, the water enters the tube and nozzle at the lower ends thereof and is ejected from the chamber by the steam and injected into the pipe 14, secured at one end to the boss 13 and which is adapted to be connected with a boiler at its other end.

Having thus described my invention, what I claim, and desire to secure by Letters Patent, is—

1. In an ejector, a casing, a removable cap to close one end of the casing, a steam-injecting nozzle on the cap, a removable cap to close the other end of the casing, an ejecting-tube carried by the cap, an ejecting-nozzle carried by the cap, and means to permit the nozzle and tube carried by the last-mentioned cap to be moved longitudinally with relation to the nozzle carried by the first-mentioned cap and with relation to each other.

2. In an ejector, a casing having a removable cap on one end provided with an integral nozzle, a removable cap on the other end of the casing provided with a depending wall, an adjustable ejecting-tube mounted in the depending wall, an adjustable nozzle mounted in the cap, and means to lock the nozzle in its adjusted position.

In testimony whereof I affix my signature in presence of two witnesses.

WILLIAM D. LABADIE.

Witnesses:
GEORGE OLTSCH,
D. J. MCILREE.